(12) United States Patent
Chiang et al.

(10) Patent No.: US 6,552,964 B2
(45) Date of Patent: Apr. 22, 2003

(54) STEERABLE BEAMFORMING SYSTEM (75) Inventors: Alice M. Chiang, Weston, MA (US);
Steven R. Broadstone, Woburn, MA (US)

(73) Assignee: TeraTech Corporation, Burlington, MA (US)

( * ) Notice: Subject to any disclaimer, the term of this patent is extended or adjusted under 35 U.S.C. 154(b) by 0 days.

(21) Appl. No.: 09/828,266

(22) Filed: Apr. 6, 2001

(65) Prior Publication Data

US 2002/0064093 A1 May 30, 2002

Related U.S. Application Data

(63) Continuation of application No. 09/364,699, filed on Jul. 30, 1999, now Pat. No. 6,292,433, which is a continuation of application No. PCT/US98/02291, filed on Feb. 3, 1998, and a continuation-in-part of application No. 08/965,663, filed on Nov. 6, 1997, now Pat. No. 6,111,816.

(60) Provisional application No. 60/195,587, filed on Apr. 6, 2000, and provisional application No. 60/036,837, filed on Feb. 3, 1997.

(51) Int. Cl.[7] ............................................. H04B 1/02
(52) U.S. Cl. .................................................... 367/138
(58) Field of Search .............................. 367/138, 7, 11, 367/103, 119; 342/154, 179, 180; 600/447

(56) References Cited

U.S. PATENT DOCUMENTS

| 4,034,483 A | 7/1977 | Bernstein et al. ............. 35/10.4 |
| 4,152,678 A | 5/1979 | Shott et al. ................... 333/150 |
| 4,159,462 A | 6/1979 | Rocha et al. | |

(List continued on next page.)

FOREIGN PATENT DOCUMENTS

| EP | 0 593 822 A1 | 4/1994 |
| GB | 2 130 798 A | 6/1984 |

OTHER PUBLICATIONS

Takeuchi, Y., "Coded Excitation for Harmonics Imaging," IEEE Ultrasonics Symposium, 1433–1436 (1996).

Tanaka, T., et al., "Digital Signal Processor for Digital Multi Beam Forming Antenna in Mobile Communication," ATR Optical and Radio Communications Research Laboratories, 1507–1511 (Aug. 6, 1994).

Beetner, D.G., and Arthur, M.R., "Generation of Synthetic–Focus Images from Pulse–Echo Ultrasound Using Difference Equations," IEEE Transactions on Medical Imaging, vol. 15, No. 5, 665–672 (Oct. 1996).

Broadstone, S.R., and Arthur, M.R., "Determination of Time–of–Flight Surfaces Using the Methods of Moments" IEEE, Transactions on Medical Imaging, 10(2) 173–179 (Jun. 1991).

(List continued on next page.)

*Primary Examiner*—Daniel T. Pihulic
(74) *Attorney, Agent, or Firm*—Bowditch & Dewey, LLP (57) ABSTRACT

The need for multiple, cost-effective deployment of an underwater camera has resulted in the development of a low-power high-resolution imaging system using a sparse array. The system can be used for undersea acoustic mine-field reconnaissance and mine-hunting systems for example, this imaging sonar is portable enough for use in a diver's hands or in a remote imaging sonar on an unmanned undersea vehicle in shallow waters. The present system can simultaneously focus many signals using multiple CCD/CMOS, programmable time-delay beamforming circuits connected to a sparsely-populated 2D acoustic array, is being developed. Using this approach, a real-time image can be formed to search for mine-like objects. To make a sparse array, the combination of low insertion loss and wide bandwidth performance is important for realizing acceptable imaging performance with low illumination levels.

15 Claims, 7 Drawing Sheets

U.S. PATENT DOCUMENTS

| | | | |
|---|---|---|---|
| 4,227,417 A | 10/1980 | Glenn | 73/625 |
| 4,233,678 A | 11/1980 | Brady, III | 367/122 |
| 4,241,608 A | 12/1980 | Dees et al. | 73/606 |
| 4,244,037 A | 1/1981 | Jelks | 367/121 |
| 4,245,333 A | 1/1981 | Jelks | 367/121 |
| 4,253,168 A | 2/1981 | Petrosky et al. | 367/123 |
| 4,254,662 A | 3/1981 | Kuroda et al. | 73/626 |
| 4,267,584 A | 5/1981 | McKeighen et al. | 367/11 |
| 4,274,148 A | 6/1981 | Hullenaar | 367/122 |
| 4,277,787 A | 7/1981 | King | 343/100 |
| 4,307,613 A | 12/1981 | Fox | 73/626 |
| 4,313,184 A | 1/1982 | Jarman et al. | 367/88 |
| 4,336,607 A | 6/1982 | Hill et al. | 367/123 |
| 4,401,957 A | 8/1983 | McKeighen et al. | 333/165 |
| 4,464,726 A | 8/1984 | Chiang | |
| 4,544,927 A | 10/1985 | Kurth et al. | 343/373 |
| 4,616,231 A | 10/1986 | Autrey et al. | 342/374 |
| 4,947,176 A | 8/1990 | Inatsune et al. | 342/173 |
| 5,014,250 A | 5/1991 | Hadderingh | 367/124 |
| 5,029,144 A | 7/1991 | Griffin | 367/11 |
| 5,030,953 A | 7/1991 | Chiang | 341/172 |
| 5,031,625 A | 7/1991 | Higashiizumi et al. | |
| 5,089,983 A | 2/1992 | Chiang | |
| 5,126,962 A | 6/1992 | Chiang | 364/725 |
| 5,200,755 A | 4/1993 | Matsuda et al. | 342/158 |
| 5,228,007 A | 7/1993 | Murakami et al. | 367/103 |
| 5,276,452 A | 1/1994 | Schuss et al. | 342/371 |
| 5,309,409 A * | 5/1994 | Jones et al. | 367/103 |
| 5,343,211 A | 8/1994 | Kott | 342/379 |
| 5,386,830 A | 2/1995 | Powers et al. | |
| 5,517,537 A | 5/1996 | Greene et al. | 376/252 |
| 5,530,680 A | 6/1996 | Whitehurst | 367/99 |
| 5,533,383 A | 7/1996 | Greene et al. | 73/40.5 A |
| 5,535,150 A | 7/1996 | Chiang | |
| 5,546,807 A | 8/1996 | Oxaal et al. | 73/606 |
| 5,555,200 A | 9/1996 | Chiang | 364/606 |
| 5,555,534 A | 9/1996 | Maslak et al. | 367/135 |
| 5,590,658 A | 1/1997 | Chiang et al. | 128/661.1 |
| 5,623,930 A | 4/1997 | Wright et al. | 128/661.1 |
| 5,685,308 A | 11/1997 | Wright et al. | 128/660.07 |
| 5,822,276 A * | 10/1998 | Miklovic | 367/103 |
| 5,825,898 A | 10/1998 | Marash | |
| 5,904,652 A | 5/1999 | Gilbert et al. | |
| 6,111,816 A | 8/2000 | Chiang et al. | |

OTHER PUBLICATIONS

Shott, J.D., et al., "Charge–coupled devices for use in electronically–focused ultrasonic imaging systems" 8049 Preceedings of the I.E.E.–F., vol. 127 (1980) Apr., No. 2, Stevenage.

Macovski, Albert, "Ultrasonic Imaging Using Arrays" Proceedings of the IEEE, vol. 67, No. 4, Apr. 1979.

Brady, J.J., "A serial phase shift beamformer using charge transfer devices," 8014 Journal of Acoustical Sty of America, vol. 68 (1980) Aug., No. 2, New York, NY 504–507.

Broadstone, S.R., et al., "Low–Power, High–Resolution 3D Sonar Imaging System," SPIE Conference, vol. 3711: 57–67 (Apr. 1999).

Greening, M.V., et al., "Optimal linear sparse arrays," Defense Science and Technology Organization No date given.

Benjamin, K.C., "The Development of a Very Large, Dense Packed, Two–Dimensional, Ultrasonic Imaging Array," Paper presented at the 23$^{rd}$ Synosium Acoustical Imaging, Boston, MA (Apr. 1997).

Kay, S.M., "Comments on Underwater Camera Design," pp. 1–10 (1999).

Impagliazzo, J., et al. "Prototype Sparse Arrays for 3D Sonar Imaging System," pp. 1–6.

Manzie, G., "High resolution acoustic mine imaging," Thomson Marconi Sonar Pty. No date given.

"Multi–Media Pentium II/III Ruggedized Notebook" MiTAC e–Centric Corp. Brochure.

"GETAC CA35 Ruggedized Tablet PC" MiTAC e–Centric Corp. Brochure.

* cited by examiner

STEERABLE BEAMFORMING SYSTEM

RELATED APPLICATIONS

This application claims the benefit of U.S. Application No. 60/195,587 filed Apr. 6, 2000 and a continuation of U.S. application Ser. No. 09/364,699 filed on Jul. 30, 1999, now U.S. Pat. No. 6,292,433, which is a Continuation of PCT/US98/02291 filed on Feb. 3, 1998, and a Continuation-in-Part of U.S. application Ser. No. 08/965,663 filed on Nov. 6, 1997, now U.S. Pat. No. 6,111,816, which claims the benefit of U.S. Application No. 60/036,837 filed on Feb. 3, 1997, the contents of which are incorporated herein by reference in their entirety.

BACKGROUND OF THE INVENTION

In numerous applications there is a need to perform beamforming operations to acquire spatial information regarding a particular region of interest. Various systems have been developed to perform such beamforming operations which frequently depend upon the particular applications.

One application involves beamsteering and/or beamforming in medical ultrasound systems used to image internal organs. For undersea acoustic mine-field reconnaissance and mine hunting applications, high-resolution imaging sonars are needed for clutter rejection, obstacle avoidance, and identification of possible mines. For these applications, a light-weight, low-power, low-cost and portable sonar system is needed for use in a diver's hands, in a remote imaging sonar on an unmanned undersea vehicle, or with a small surface-craft sonar.

SUMMARY OF THE INVENTION

The present invention relates to a high-resolution, three-dimensional imaging system based on a large-area electronically steerable two-dimensional array. The large aperture provides a beamwidth less than 0.3°. Beamforming, or beamsteering, can be performed using time-domain delay-and-sum operations. A delay-and-sum beamformer allows a 2D array to "look" for signals propagating in a particular direction. By adjusting the delays associated with each element of the array, the array's directivity can be electronically steered toward the source of radiation. By systematically varying the beamformer's delays and its shading along a 2D imaging plane, a 2D scan response of the array can be measured and resulting 2D images representing the 3D radiation sources can be created. The proposed system can provide continuous real-time 128-by-128-pixel scanned images throughout a 14° field of view. The proposed delay-and sum beamforming approach allows target range information to be obtained from the time-of-flight calculations. When a target area is identified by the proposed electronically steerable sonar system, the beamforming electronics can be adjusted to zoom-in to a smaller field-of-view for high-resolution imagery.

Components of the system include a large-area, low-insertion loss and high-bandwidth sparse array, a 32-channel beamforming processor, a bank of low-noise amplifiers, and CDP FIR filters for baseband signal conversion. The beamforming electronics and FIR filters use low-power, high-throughput charge-domain-processing (CDP) technology. At a 40 MHZ clock rate, the beamformer can provide a continuous computation throughput of 10.2 billion operations per second and a delay update rate of 28 billion bits/s and dissipate approximately 1 W of electric power. A technology comparison (shown in Table 1) of the present low-power, 2D beamformer, a commonly-used microprocessor and a digital signal processor (DSP) the Texas Instruments' TMS320C6201 processor, demonstrates the more than an order-of magnitude power savings offered by a preferred embodiment of the invention.

In a preferred embodiment of the invention uses a shading procedure to increase the ratio of the main lobe relative to the side lobes to provide a difference of at least 20 dB, and preferably of at least 25 dB to provide the desired image quality. The small size of the array, such as a 10 cm×10 cm system, or alternatively a 20 cm×20 cm system, can provide a low power, high resolution system suitable for use by divers or small vessels, for example.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present CDP beamformer processing system is a time domain processor that simultaneously processes the returns of a large, sparsely packed two dimensional array. This can be used in a sonar system, for example, that utilizes a single-ping transmit. The lower power, highly integrated CDP beamformer provides real time processing of the entire array, and thus, enables a low cost unit suitable for use in autonomous underwater vehicle (AUV) platforms. Imaging a full 3D volume with a single-ping excitation dictates the use of a large diameter sparsely sampled array. A smaller diameter, more completely filled array does not have the required resolution. The electronics for a large, filled array does not fit within the AUV. In addition, a mechanically scanned imaging system can not have the frame rate capability to create a complete 3D volumetric image with one transmit burst.

Beamformer devices used in conjunction with the present invention, including the use of such systems in medical ultrasound applications are described in U.S. application Ser. No. 09/364,699 filed on Jul. 30, 1999, in International Application No. PCT/US98/02291 filed on Feb. 3, 1998 and in U.S. application Ser. No. 08/965,663 filed on Nov. 6, 1997, the entire contents of the above applications being incorporated herein by reference.

To make a sparse array practical, the combination of low insertion loss and wide bandwidth performance is important for realizing acceptable imaging performance with low illumination levels. Quarter-wave matching layers with low acoustic impedance, but physically solid backing results in a robust array that loses only 3–4 dB in the conversion of received signal energy to electrical energy. Array bandwidths of 75% or more are typical of this design and construction process. Also, the transducer array employs element positioning and an interconnect system suitable for the beamformer circuitry. The electronics are mounted on printed-circuit boards that are attached to the transducer elements via flexible cables. In practice, a majority of the array elements are connected to outputs using the flexible cables. However, only a small fraction of the total number of elements are wired to the circuit boards. Nevertheless, the large number of array element connections are sufficient to insure a unique pattern of active-element locations in the final array.

The array described addresses AUV and diver-mounted imaging applications using a two-dimensional array with a diameter of 20 cm and a frequency of 2 MHZ. The minimum range requirement of three meters, and the need for resolution on the order of less than one centimeter, dictates as large of an aperture as possible that can be housed within a compact package. To interrogate a fourteen-degree scanning volume and also minimize the impact of grating lobes, an element pitch or separation of less than 0.78 mm is desirable. Thus, a fully populated array has at least 256 elements on a side. Given existing technology, however, the processing of the number of channels is impractical. Thus, a pseudo random array design is used to achieve this resolution within the limited number of processing channels that can be provided.

The single-ping transmitter can be a single-element spherical section that has the same beam width as that of the individual elements. The transmitter can be mounted either in the center of the array or on one of the sides of the array. If the CDP beamformer has sufficient flexibility in the receive dynamic focusing control, a side mounted transmitter has packaging advantages.

As an example, assuming a 20 cm diameter array with 225 active elements and approximately 1.04 λ element-pitch, the resulting filling factor is 0.34%. The output signal to noise ratio of the array is proportional to the number of active-elements, so this filling factor corresponds to a loss in sensitivity of −23 dB when compared to a filled array of the same dimensions. To compensate for this loss, a transmitted signal of modest bandwidth (approximately 670 kHz) is chosen to increase array sensitivity. In the approach presented here, the sensitivity is increased on the order of 10 dB.

TABLE 1

Technology Comparison for the 2D Beamformer

| | Intel Digital CMOS | Texas Instruments Digital CMOS | TeraTech CCD/CMOS |
|---|---|---|---|
| Technology | 0.25 mm 5 Metal | 0.18 mm 5 Metal | 0.6 mm 2 Metal |
| Architecture | Pentium Pro | TMS320C6201 | Dedicated Processor Sampled |
| Signal Resolution | 64 Bits | Floating Point | Analog |
| Reference Weights | 64 Bits | Floating Point | 8 bits |
| Maximum Throughput Rates (Billion Operations/second) | 0.4 | 1.86 | 10.2 |
| Number of chips (32 Channels) | 24 | 2 | 1 |
| Power Dissipation | 600 W | 12 W | 1 W |

Figure 1:
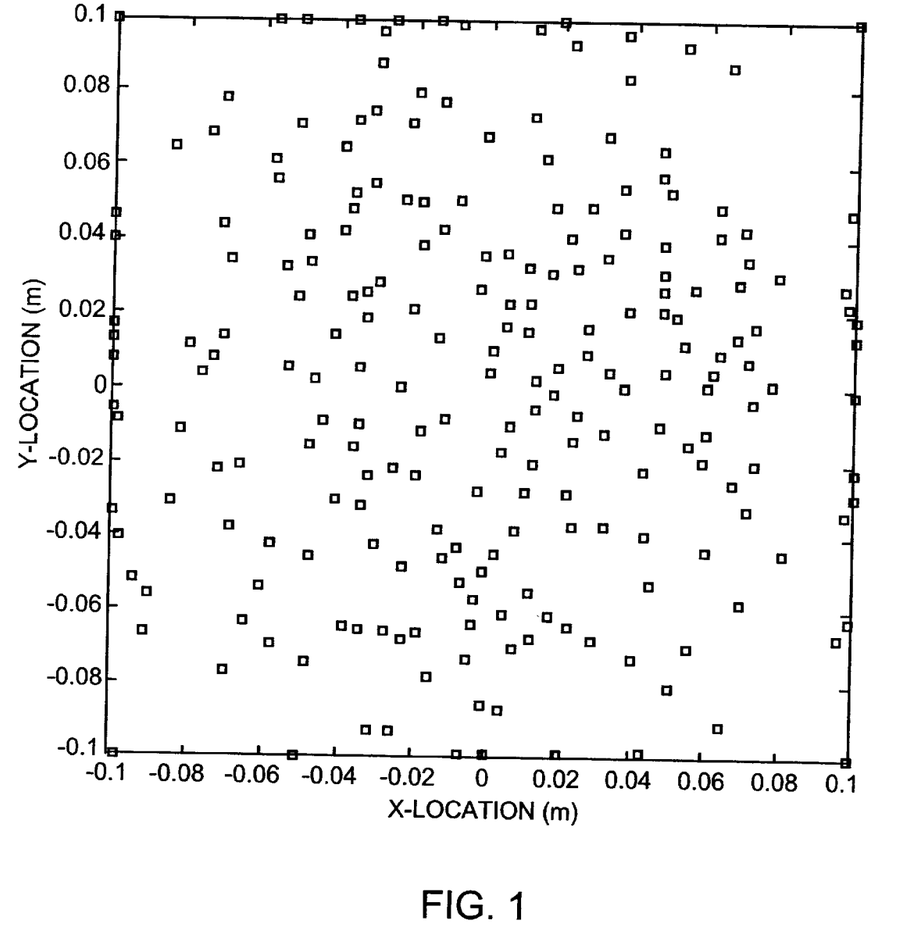
FIG. 1 shows pseudorandom array-element placement based on the minimization of the weighted side lobe energy.

The positioning the elements of the array follows the approach in which care must be taken to eliminate any periodicity that would produce grating lobes that compete with the main lobe. Pseudorandom or random arrays can be used (FIG. 1). The geometry of element placement has been developed to maximize the efficiency of the CDP beamformers while minimizing grating and side lobe clutter.

The primary goal of the optimization method is to minimize the average side lobe energy. Specifically, this is done by interactively evaluating the optimization criterion:

$$J = \frac{1}{2u_{mx}^2} \int\int_s W(u_x, u_y) B(u_x, u_y) du_x du_y, \tag{1}$$

where the weighting function, $W(u_x, u_y)$, applies more weight to regions in the array response that require side lobe reduction. The optimization method begins with no weighting (i.e., $W(u_x, u_y)=1$) and proceeds by choosing successively better weighting functions that satisfy the optimization criterion. Since the side lobes that require the greatest reduction are related to the previously computed beampattern, $B(u_x, u_y)$, the weighting is chosen such that $W(u_x, u_y)=B(u_x, u_y)$. This is done in an interactive manner until convergence.

Basically, a random array is capable of producing an imaging point spread function that has a main lobe to average side lobe ratio of N, where N is the total number of active elements in the array. For the 225-element sparse array example, the resulting ratio is −23 dB. Using a wide bandwidth approach improves this ratio by 10 dB. Based on the preceding optimization criterion, a pseudorandom placement of the array elements was generated (FIG. 1).

Figure 2:
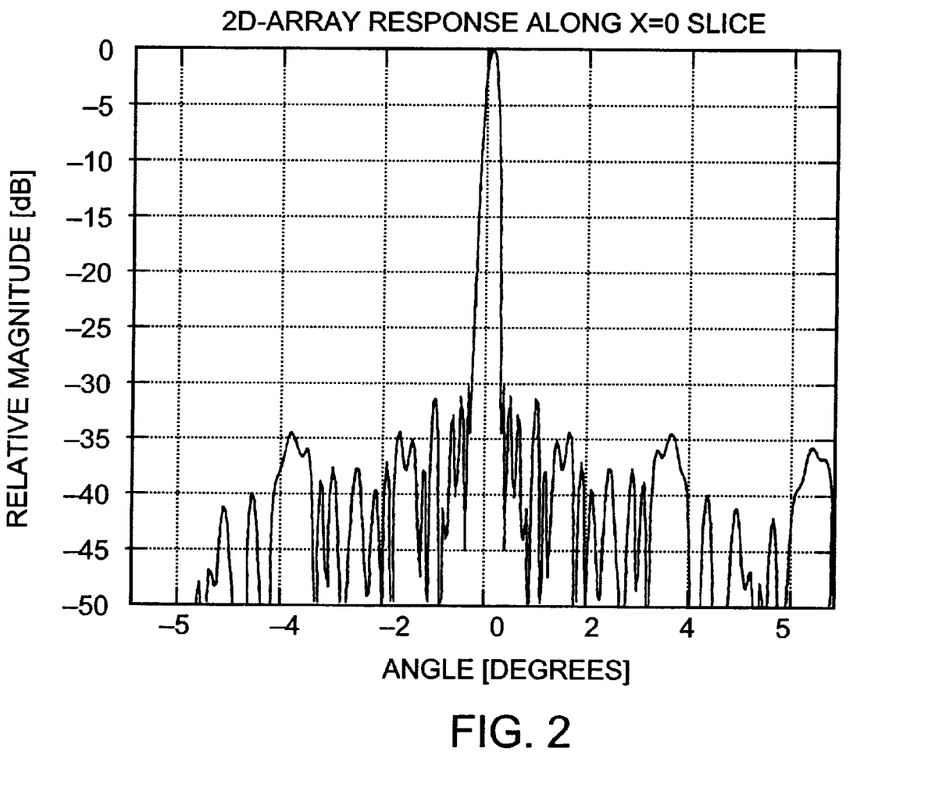
FIG. 2 shows a 2-D array response along a slice through the y axis (elevation) of the sparsely sampled 225×225 element 2D sonar array. The array response assumes a 600 kHz incident waveform steered directly ahead of the array and plotted over a steering angle of 14 degrees.

FIG. 2 is a plot of the array performance, sensitivity versus cross range, for a 225-element sparsely-sampled array at 2 MHZ. The peak to maximum side lobe level is approximately 30 dB. To improve this performance, the system is configured to achieve the maximum main lobe to clutter level ratio possible, has been independently verified.

The objective of the beamforming system is to focus signals received from an image point onto a transducer array. By inserting proper delays in a beamformer to wavefronts that are propagating in a particular direction, signals arriving from the direction of interest are added coherently, while those from other directions do not add coherently or cancel. For a multi-beam system, separate electronic circuitry is necessary for each beam. Using conventional implementations, the resulting electronics rapidly become both bulky and costly as the number of beams increases. Traditionally, the cost, size, complexity and power requirements of a high-resolution beamformer have been avoided by "work-around" system approaches. These systems form a minimum number of beams even though many more independent beams are possible with the number of transducer elements typically used in the sonar array. For example, a small underwater-vehicle configuration preferably has a center beam together with four adjacent beams aimed left, right, above and below the center. The beams are each formed from fifty or more elements in an array each phased appropriately for the coherent summation in the five directions of interest. The advantage of using so many elements is a narrower beamwidth when compared with a smaller array. However, knowledge of the outside world is still based on a five pixel image. For real-time 3D high-resolution sonar imaging applications, an electronically steerable two-dimensional beamforming processor based on a delay-and-sum computing algorithm is chosen.

A delay-and-sum beamformer allows a 2D array to "look" for signals propagating in particular directions. By adjusting the delays associated with each element of the array, the array's look direction can be electronically steered toward the source of radiation. By systematically varying the beamformer's delays and its shading or apodization along a 2D imaging plane, a 2D scan response of the array can be measured, and the resulting 2D images representing the 2D radiation sources can be created. To realize such a delay-and-sum beamformer, a programmable delay line is needed at each receiver. However, as the array is scanning through the imaging plane, there are two difficult implementation issues: first, each delay line has to be long enough to compensate for the path differences of a large area array, and second, the delay value has to be adjusted periodically for proper beamsteering. Preferably, the time-of-flight from the radiation source to the focal point can be calculated at every clock cycle.

Figure 3:
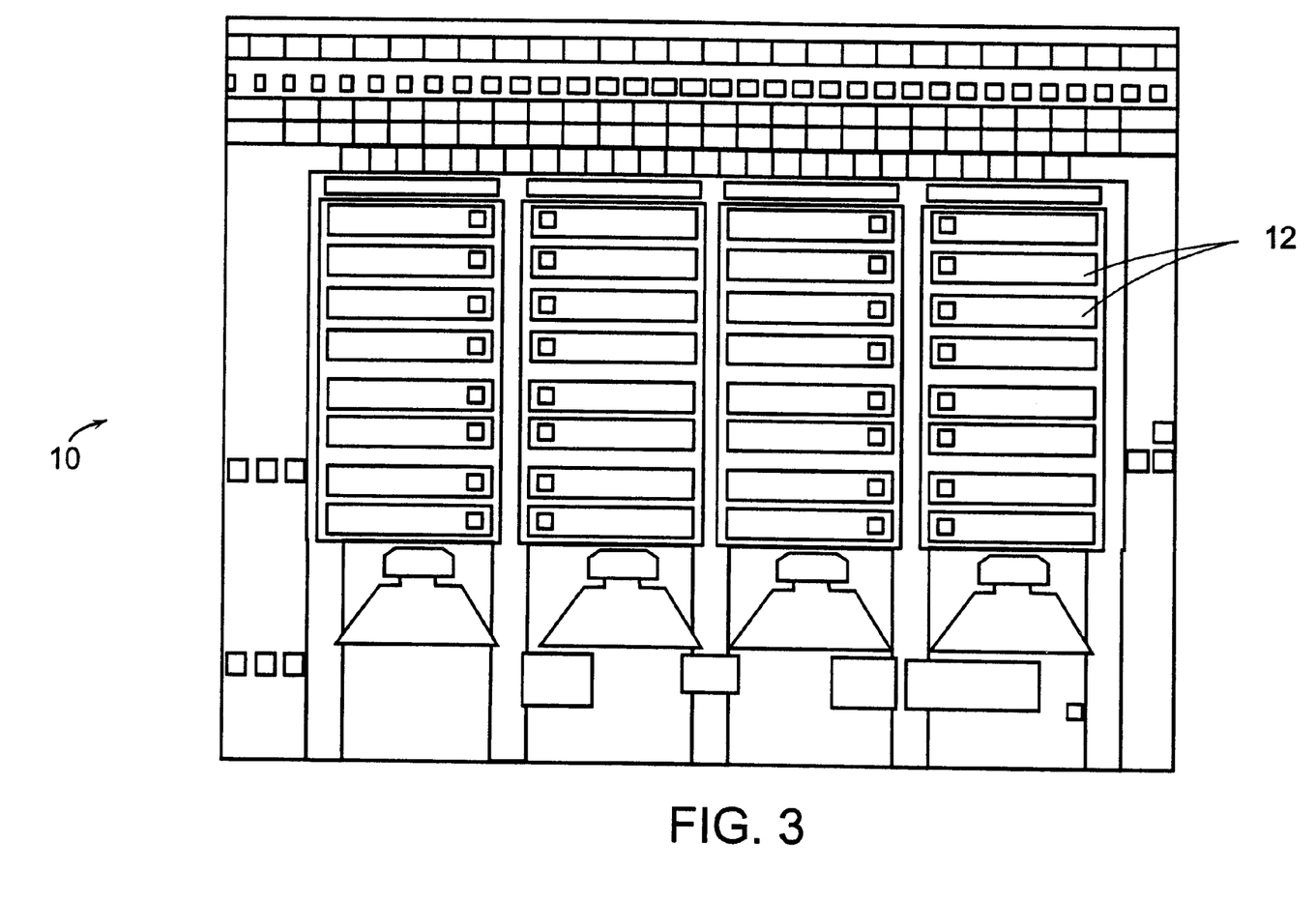
FIG. 3 illustrates a 32-channel CDP beamformer having the capability to dynamically focus and steer the energy detected by the two-dimensional sonar array.

For example, for a 3 m range requirement with a cross-range resolution of less than one centimeter dictates an array aperture in the range of 20 cm. To probe a fourteen-degree scanning volume, a maximum differential delay of 1.7 cm is needed; in turn, that corresponds to a maximum temporal delay of 11.5 $\mu$s. At a 40 MHZ clock rate, this implies that a 500-stage delay line and a 9-bit control word are needed at each receiver to achieve the time-of-flight delay requirements. The long delay and large number of digital I/Os set an upper limit on how many processors can be integrated on one chip. For the 32-channel beamforming electronics 10 depicted in FIG. 3, a straightforward implementation requires 32 500-stage delay lines 12 and 352 digital I/O pads. Such a large-area chip and large number of I/O connections would make the implementation impractical. An electronically-controlled conformal lens structure is used to circumvent the impracticably long delay line requirement. A delay-update computation method, based on the determination of time-of-flight surface coordinates, is used to reduce the digital I/O requirement.

Figure 4:
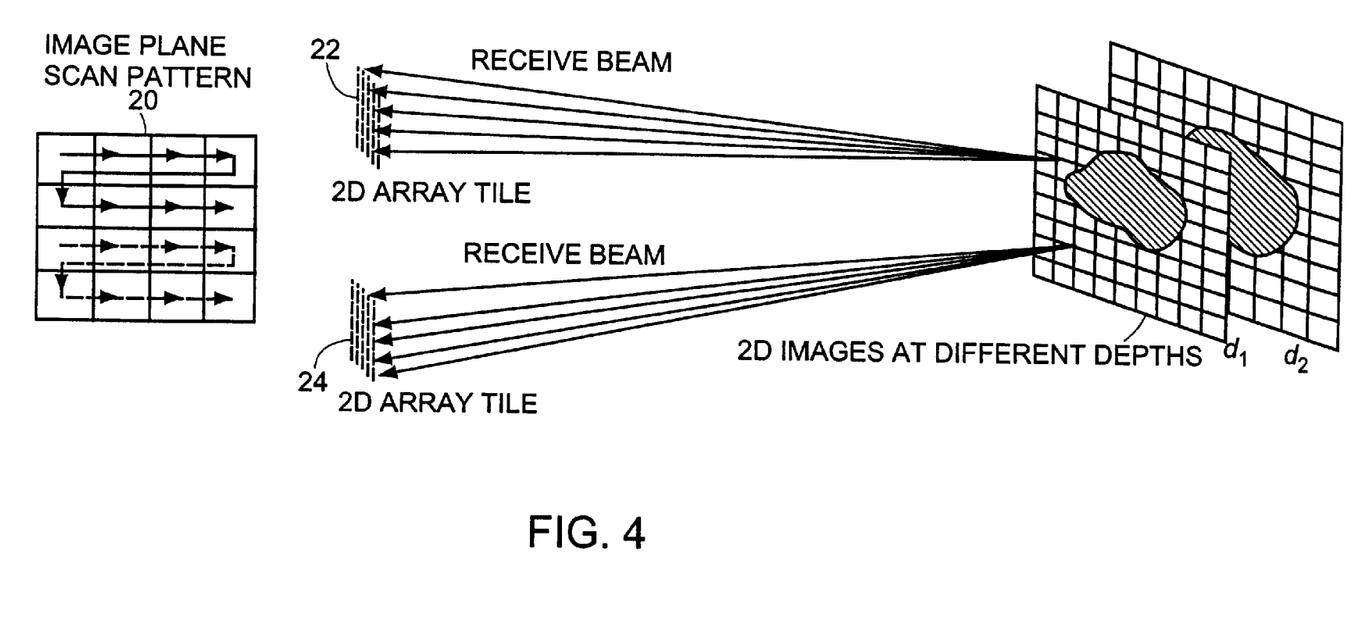
FIG. 4 is a schematic illustration of the 2D array tiles that comprise the ECCAL sonar array. Each tile comprises a pattern of pseudorandomly selected elements. The differential delays computed within a tile are approximated to be in the far-field. The outputs from each of the tiles are combined using global, near-field delays.

The concept of an electronically-controlled conformal acoustic lens (ECCAL) is to divide the surface of a 2D transducer array into planar "tiles" of relatively small subarrays. As depicted in FIG. 4, the tiles/subarrays 22,24 are made small enough so that when an object is placed within the field-of-view of the imaging system, the incident radiation from the object toward each "tile" can be treated using a far-field approximation. Additional delay elements are incorporated within each subarray to allow all subarrays to be coherently summed (i.e., global near-field beamforming can be achieved by simply delaying and then summing the outputs from all subarrays). The delay-and-sum beamformer allows each subarray to simultaneously "look" for signals radiating from a particular direction. By adjusting the delays associated with each element of the array, the array's look direction can be electronically steered toward the possible source of radiation along a scan pattern 20. The delay line requirement for each element in the subarray can be as short one hundred or as several hundred stages. Only a single long delay for global summing is needed on each subarray processor.

While the ECCAL system is new to sonar applications, the deformable-mirror concept has been investigated and successfully implemented in optical systems for more than two decades. For example, it has been demonstrated a real-time, deformable mirror used to compensate for atmospherically induced wavefront distortions, including the first real-time demonstration of thermal-blooming compensation of a high-energy laser.

In sonar imaging applications, focus-and steer images require knowledge of the time of flight from each source to each receiver in an array. The computation of a new point on any time-of-flight surface requires finding the square root of the sum of squares, which is a computationally intensive task. A delay-update computation method is presented here which reduces the determination of the rectangular coordinates of a new point on any time-of-flight surface to the computation time of a single addition. To do this, the time-of-flight surface is represented by a two-dimensional polynomial containing positive integer powers of azimuth, elevation, and range. This polynomial in rectangular-coordinate representation allows a simple forward-difference computation for a new point on the time-of-flight surface. As a result, each update point can be computed in a single-addition time as a convenient faster scan display format.

The method of moments can be used to synthesize basis functions which represent an arbitrary multidimensional function. Although the exact time of flight requires the determination of infinitely many coefficients, a finite-degree basis function can be generated using a least-mean-square (LMS) approximation. The specific form of the finite-degree basis depends on functional separability and limits of the region of support. Using the forward-difference representation of the truncated moments basis, a new functional value can be computed at every clock cycle. If computation is performed within a square or cubic region of support, the direction of the finite difference corresponds to the direction that the function is to be computed/synthesized. For example, functional synthesis from the upper-right to lower-left corners within the region of support implies the computation of multidimensional, backward difference. Conversely the multidimensional forward-difference representation allows functional synthesis to proceed from the lower-left to the upper-right corners within the region of support.

The complete moments basis representation of a surface can be degree-limited for synthesis. One truncation method is to approximate the time of flight as f(x, y, z), a trivariate polynomial. This approximation can be written as $$\hat{g}(x, y, z) = \frac{1}{C_n} \sum_{u=0}^{U} \sum_{v=0}^{V} \sum_{w=0}^{W} \hat{a}_{u,v,w} x^u y^v z^w, \quad (2)$$

where $\hat{a}_{u,v,w}$ can be derived based on the LMS criterion, $$\frac{\partial}{\partial \hat{a}_{u,v,w}} \int_{Z_1}^{Z_2} \int_{Y_1}^{Y_2} \int_{X_1}^{X_2} [f(x, y, z) - \hat{g}(x, y, z)]^2 \, dx\,dy\,dz = 0. \quad (3)$$

Here, $c_0$ equals the propagation velocity of sound in a nearly-homogeneous medium. Once, the coefficients $\hat{a}_{u,v,w}$ of the trivariate polynomial $\hat{g}(x, y, z)$ possesses positive-integer powers of x, y, and z, it can be formulated as a stable, forward-difference equation. In general, (U+1)(V+1)(W+1) forward-difference terms are sufficient to describe a polynomial whose highest degree in x is U, y is V and z is W. The terms completely specify f(x, y, z) within its region of support.

The exact time of flight in the medium is $f(x, y, z) = r/c_0$. Although a necessary scaling factor to convert between spatial to temporal dimensions, $C_0$ will not be explicitly state in the following analysis. For this case, it is more efficient to transform the analyses to spherical coordinates. Setting x=r cos(θ)cos(φ)(cross range), y=r sin(φ)(elevation) and z=r sin(θ)cos(φ)(range); then, deriving the associated operators using the Jacobian yields $$\frac{\partial}{\partial \hat{a}_{u,v,w}} \int_{\phi_1}^{\phi_2} \int_{\theta_1}^{\theta_2} \int_{r_1}^{r_2} [r - \hat{g}(r, \theta, \phi)]^2 r^2 \cos(\phi) \, dr\,d\theta\,d\phi = 0. \quad (4)$$

The polynomial coefficients, $\hat{a}_{u,v,w}$, are found by solving a set of linear equations in cross range and elevation for cross-sectional displays (or C-scans); or, in range and cross range for range scans. For volumetric or 3D imaging, the coefficients can be derived in each of the cross range, elevation and range dimensions. These equations may be more conveniently written in matrix notation as $$B\hat{a} = m \quad (5)$$

where $\hat{a}$ represents the polynomial coefficient vector. The matrix B contains elements comprised of integral sums of the form $$b_{i,j,k} = \int_{\phi_1}^{\phi_2} \int_{\theta_1}^{\theta_2} \int_{r_1}^{r_2} r^{u+v+w} \cos^u(\theta) \sin^v(\theta) \quad (6)$$

$$\cos^{u+v}(\phi) \sin^w(\phi) \frac{\partial}{\partial \hat{a}_{u,v,w}} \hat{g}(r, \theta, \phi) r^2 \cos(\phi) \, dr\,d\theta\,d\phi.$$

The variables u, v, and w respectively range from 0 to U, V, and W the highest dimensions of the finite-degree polynomial in dimensions x, y, and z. The vector m contains the moments of the time of flight within the region of support $$m_i = \int_{\phi_1}^{\phi_2} \int_{\theta_1}^{\theta_2} \int_{r_1}^{r_2} r \frac{\partial}{\partial \hat{a}_{u,v,w}} \hat{g}(r, \theta, \phi) r^2 \cos(\phi) \quad (7)$$

Evaluating the partial inside the preceding integrals yields $$\frac{\partial}{\partial \hat{a}_{u,v,w}} \hat{g}(r, \theta, \phi) = r^{u+v+w} \cos^u(\theta) \sin^v(\theta) \cos^{u+v}(\phi) \sin^w(\phi). \quad (8)$$

The preceding integrals are evaluated in parts as functions or r, θ, and φ. The integral dependent on the radial distance, r, is readily evaluated having only that variable raised to an integer power. The angle A (here either θ or φ) dependent integrals contain sine, cosine and sine-cosine cross products raised to an arbitrary integer power. Iterative solutions exist using the integrals $$\int_{A_1}^{A_2} \sin^m cA \cos^n cA \, dA = \quad (9)$$

$$\frac{\sin^{m-1} cA \cos^{n+1} cA}{c(m+n)} + \frac{m-1}{m-n} \int_{A_1}^{A_2} \sin^{m-2} cA \cos^n cA \, dA$$

and $$\int_{A_1}^{A_2} \sin^m cA \cos^n cA \, dA = \quad (10)$$

$$\frac{\sin^{m+1} cA \cos^{n-1} cA}{c(m+n)} + \frac{n-1}{m+n} \int_{A_1}^{A_2} \sin^m cA \cos^{n-2} cA \, dA$$

The coefficient vector, â, is obtained by inverting matrix B then multiplying with moments vector m. The matrix inversion is accomplished using Cholesky decomposition or the more numerically robust Housebolder transform.

For this application, the volume of interest is to be scanned in a series of cross-sectional planes (or C-scans) separated by approximately 1 cm in depth. Each cross-sectional scan is performed in a raster fashion (i.e., uniformly sampled in three-dimensional Cartesian coordinates) and has been scaled so that the sampling-interval step size is 1. As an example, the first and second forward differences in one dimension x, are $$\Delta 1_x^2 \hat{g} = \hat{g}(x_0+1, y_0, z_0) - \hat{g}(x_0, y_0, z_0),$$

$$\Delta 1_x^2 \hat{g} = \hat{g}(x_0-2, y_0, z_0) - 2\hat{g}(x_0+1, y_0, z_0) + \hat{g}(x_0, y_0, z_0) \quad (11)$$

This difference expansion about $(x_0, y_0, z_0)$ in the positive x dimension continues until the degree of the finite-difference is identical to the degree of the finite-degree polynomial $\hat{g}(x, y, z)$.

The coefficients associated with each of the terms in the summations comprising the preceding difference expansions form Pascal's triangle differing by a sign in every other term. This relationship is more generally written $$\sum_{u=0}^{L} \begin{bmatrix} u \\ L \end{bmatrix} = \sum_{u=0}^{L} (-1)^{L-u} \frac{u!}{L!(L-u)!}. \quad (12)$$

Using this equation, the $L^{th}$ forward difference of the preceding arbitrary-degree polynomial can be more succinctly written:

$$\Delta 1_x^l \hat{g}(x_0, y_0, z_0) = \sum_{u=0}^{L} (-1)^{L-u} \begin{bmatrix} u \\ L \end{bmatrix} \hat{g}(x_0 + u_0, y_0, z_0). \quad (13)$$

It follows that the three-dimensional difference expansions about ($x_0$, $y_0$, $z_0$) can be obtained by evaluating the cross product of terms in $\hat{g}(x, y, z)$, $$\Delta 1_x^L \Delta 1_y^M \Delta 1_z^N \hat{g} = \sum_{u=0}^{L}\sum_{v=0}^{M}\sum_{w=0}^{N} (-1)^{L+M+N-u-v-w} \begin{bmatrix} u \\ L \end{bmatrix}\begin{bmatrix} v \\ M \end{bmatrix}\begin{bmatrix} w \\ N \end{bmatrix} \quad (14)$$

$$\hat{g}(x_0 + u, y_0 + v, z_0 + w).$$

Figure 5:
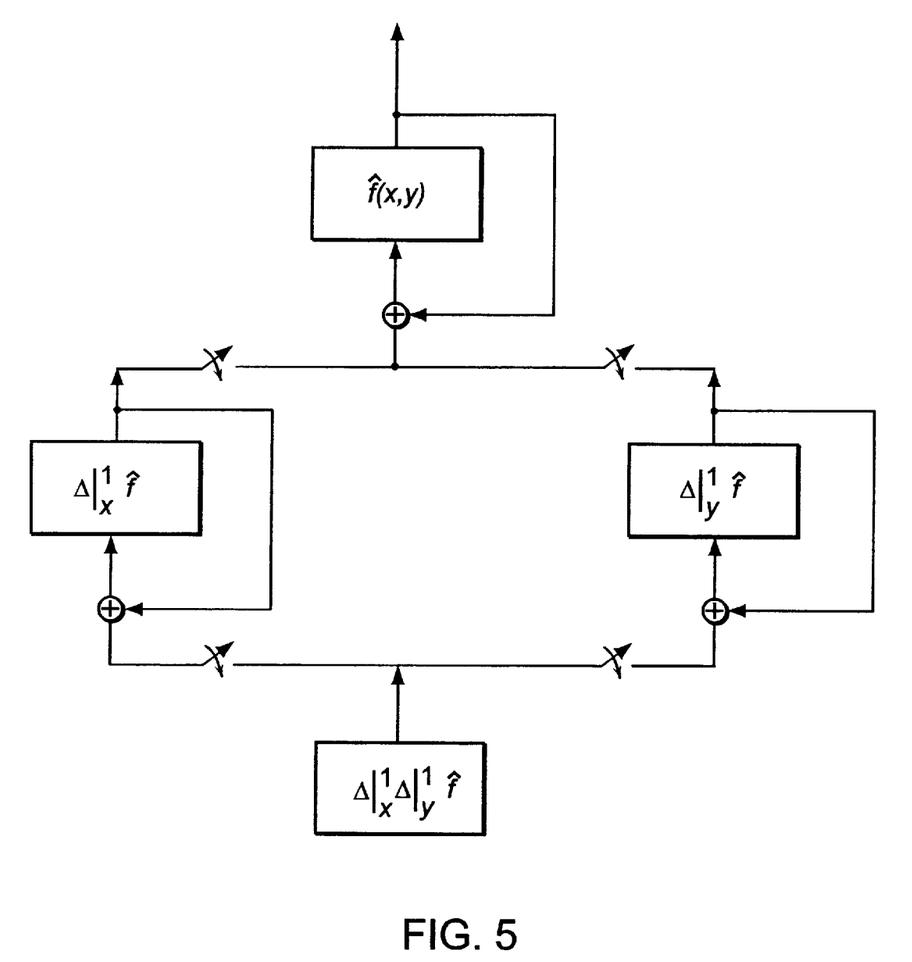
FIG. 5 is a block diagram representing the four registers within a forward-difference computing engine. Each register contains an integer corresponding to the appropriate difference of a previously computed finite-degree, multidimensional polynomial. As depicted, this engine realizes new time-of-flight delays in the time of a single addition for a cross-sectional scan.

A CMOS computing structure implementing the preceding equation can use only adders, multiplexers and registers to perform functional synthesis using the forward-difference representation of the multidimensional, finite-degree polynomial. As can be inferred, this implementation allows the synthesis of arbitrary functions using repeated additions with no multiplication. An example of this computing structure is presented in FIG. 5 for a two-dimensional, first-degree, forward-difference realization. As shown in FIG. 5, each register, represented by a rectangular box, contains the appropriate forward-difference term. Switches, which are located between registers, determine whether the cross range or elevation direction is synthesized. The advantage of this structure is that it allows additions to occur simultaneously at each of the adders.

Figure 6:
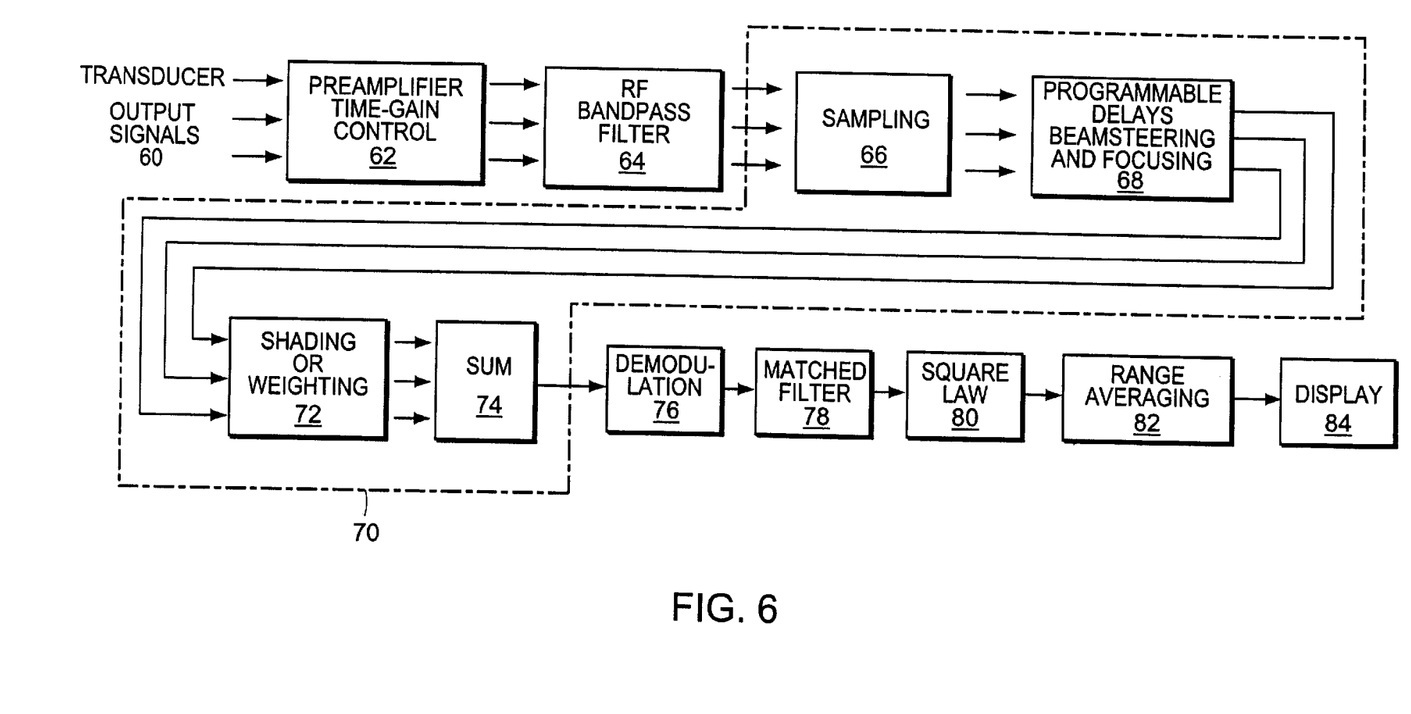
FIG. 6 illustrates a processing sequence in accordance with a preferred embodiment of the invention.

The process sequence is shown generally in FIG. 6 where the transducer output signals 60 are transmitted to gain control 62, bandpass filter 64, sampling 66, programmable delay circuit 68, weighting 72, summing 74, demodulation 76, filter 78, squaring 80, averaging 82 and then for display 84. Note that a preferred embodiment includes components fabricated on a single integrated circuit 70.

Thus, only one addition time is required to produce the next function value. For a multi-channel processor, each channel contains its own functional update circuitry. As the beam is steered through a given imaging plane, the delay requirements for each channel are computed in parallel and can be updated within on clock period. For the 32-channel beamforming processors running at a 40 MHZ sampling rate, a continuous delay update rate of 30 billion bits/s can be achieved. Using this approach, instead of the alternative 9 bits/channel, the digital connectivity can be reduced to 1 bit/channel followed by on-chip computation circuitry to generate the equivalent 9-bit value while maintaining the 30 billion bits/s parallel update rate.

For this sonar-imaging application, the energy radiated into the water can be considered to be of modest bandwidth (approximately 670 kHz) relative to the center frequency of the emission (2 MHZ). The emission or probing frequency is chosen, in part, based on the desired imaging depth of the portable hydrophone array. The bandwidth of the signal is chosen based on the characteristics of the transducer driver, the transducer element, and the desire to improve the array response while reducing the probability of detection. When using a probing signal of modest bandwidth, reflected energy captured by the receiving array must be shifted in frequency, or down converted, to base band for subsequent processing.

The reflected energy obtained from changes in acoustic impedance within the region of interest are detected by the transducer elements and then sampled and represented as packets of charge using the CDP beamformers. To reduce hardware complexity, the beamformer output data rate is chosen to be four times the center frequency of the characteristic or center frequency of the transducer elements. In a sampled-data system, this is equivalent to multiplying each sampled datum by a complex value (in phase and quadrature) that is represented by the repeating sequence I, Q, −I, −Q, etc. For example, if the input data are sequentially sampled at times a[0], a[1], a[2], a[3], a[4], . . . a[n], then the output data are a[0], j*a[1], −a[2], j*a[3], a[4], . . . These data are then filtered using finite-impulse response or FIR functions that pass low-frequency information while rejecting images of the desired signal created as a consequence of the frequency shift or down conversion.

To demonstrate the efficacy of FIR filters implemented using charge-domain processing (CDP), a FIR filter consisting of a 13-stage tapped delay line with CCD fixed-weight multipliers implementing the filter coefficients has been fabricated. For this embodiment, the data produced by the positive and negative valued filter taps are separate and the filter has two separate positive and negative-valued output ports. These two sampled-analog signals can either be recombined using an operational amplifier to produce a sampled-analog output voltage or be coupled to an A/D converter with a differential input to produce a digitized output that will be transferred to a portable PC-compatible-computer for subsequent analysis and display.

The portable sonar system described here offers the potential for three-dimensional scanning of nearby objects for the purposes of detection and identification in litoral waters. This enables custom, large-aperture, 2D, sparsely-sampled transducer array and integrated-circuitry that are more compact and dissipate less power than their all-digital counterparts. Using well-established technologies for array and integrated-circuit fabrication provides for the manufacture a high-performance sonar "camera" system.

Figure 7:
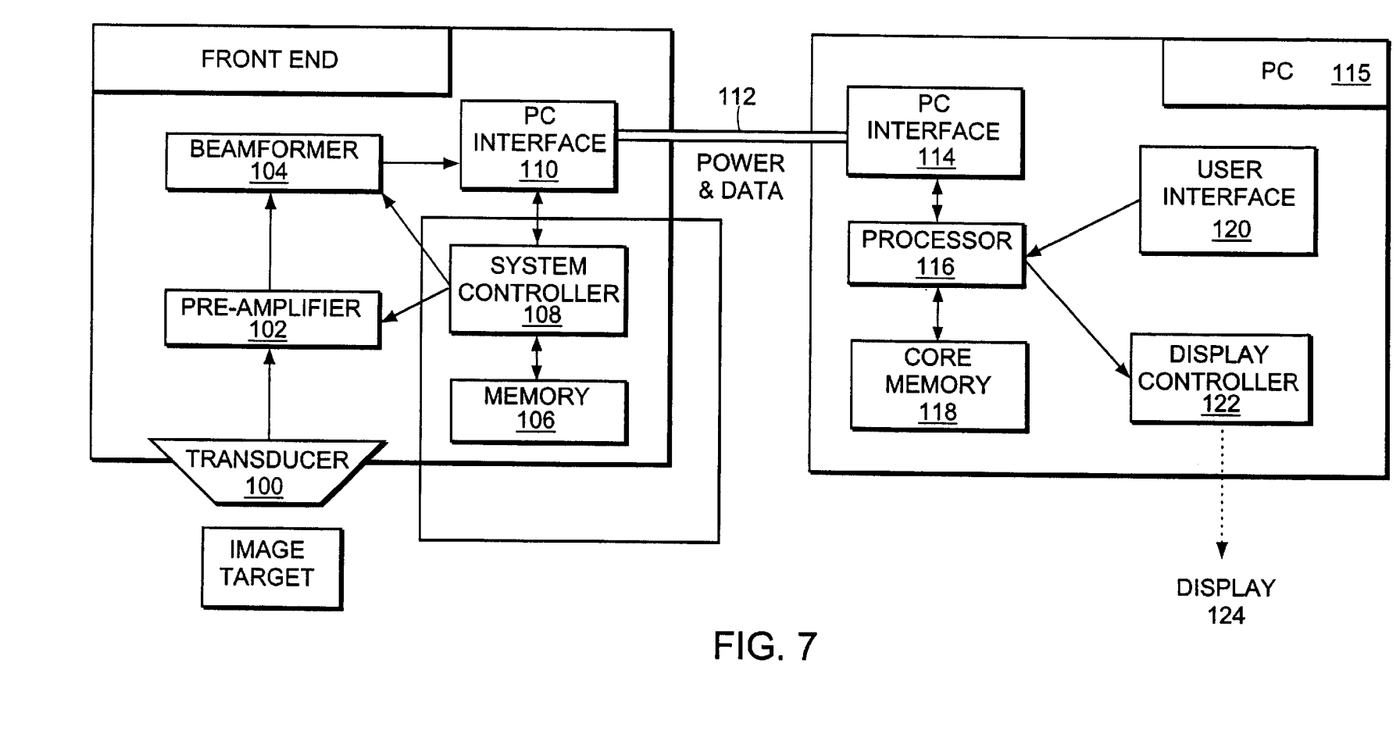
FIG. 7 illustrates a portable sonar or ultrasound system in accordance with the inventions.

The front-end array and associated electronics, shown in FIG. 7 when integrated with available PC-computer technology, provide underwater divers and AUVs with real-time, volumetric images. The transducer 100 is connected to a preamplifier 102, whose output is directed to beamformer 104. A system controller 108 receives control signals from the PC interface 110 and memory 106 stores information from controller 106. The first interface 110 also connects the beamformer output to second interface 114 along cable 112. The PC 115 includes a processor 116 memory 118, user interface 120 and a display controller 122 that forwards images and data to display 124. In turn, manufacturability results in a cost-effective complement to existing portable, 2D sonar imagers. Portability, modest cost, and 3D images generated by the sonar camera offer a new opportunity for use in a number of underwater scenarios. Current or potential dual-use commercial applications of the sonar camera include remotely piloted or autonomous undersea vehicles in support of cable-laying, pipe-following, and salvage; surface or underwater obstacle avoidance; and reconnaissance and oceanographic research.

While this invention has been particularly shown and described with references to preferred embodiments thereof, it will be understood by those skilled in the art that various changes in form and details may be made therein without departing from the scope of the invention encompassed by the appended claims.

What is claimed is:

1. A two-dimensional beamforming system comprising:
   a two-dimensional transducer array, the transducer array comprising a water borne array for a sonar system, the array having a plurality of subarrays, each subarray being connected to a subarray processor such that each subarray is simultaneously separately steerable by the processor and each subarray transducer element having a delay line having at least one hundred stages; and
   a charge domain beamforming processor connected to the array that forms an electronic representation of a region of interest, the processor comprising a charge coupled device that steers array elements in different directions.

2. The system of claim 1 wherein the processor further comprises a plurality of finite impulse response filters.

3. The system of claim 1 further comprising a zoom control to control the depth of view of the array.

4. The system of claim 1 wherein the charge domain beamformer processor is coupled to a memory circuit.

5. The system of claim 1 wherein the processor is connected to a personal computer having a second processor and a user interface.

6. The system of claim 1 wherein the electronic representation of the region of interest is a multi-dimensional image.

7. A two-dimensional beamforming system comprising:
 a two-dimensional transducer array, the transducer array comprises a plurality of subarrays, and comprises a water borne array for a sonar system; and
 a charge domain beamforming processor connected to the array that forms an electronic representation of a region of interest, the processor comprising a charge coupled device, a plurality of delay lines and a plurality of finite impulse response filters, the processor steering array elements in different directions, and each subarray being simultaneously separately steerable by the processor.

8. The system of claim 7 further comprising a zoom control to control the depth of view of the array.

9. The system of claim 7 wherein the charge domain beamformer processor is coupled to a memory circuit.

10. The system of claim 7 wherein the processor is connected to a personal computer having a second processor and a user interface.

11. The system of claim 7 wherein the electronic representation of the region of interest is a multi-dimensional image.

12. A two-dimensional beamforming system comprising:
 a two-dimensional transducer array, the transducer array comprises a plurality of subarrays, and comprises a water borne array for a sonar system;
 a charge domain beamforming processor connected to the array that forms an electronic representation of a region of interest, the processor comprising a charge coupled device, a plurality of delay lines and a plurality of finite impulse response filters, the processor steering array elements in different directions, and each subarray being simultaneously separately steerable by the processor; and
 a zoom control to control the depth of view of the array.

13. The system of claim 12 wherein the charge domain beamformer processor is coupled to a memory circuit.

14. The system of claim 12 wherein the processor is connected to a personal computer having a second processor and a user interface.

15. The system of claim 12 wherein the electronic representation of the region of interest is a multi-dimensional image.

* * * * *